United States Patent
Billington et al.

(10) Patent No.: US 10,073,525 B2
(45) Date of Patent: Sep. 11, 2018

(54) SYSTEMS AND METHODS FOR A LOW PROFILE HAPTIC ACTUATOR

(71) Applicant: Immersion Corporation, San Jose, CA (US)

(72) Inventors: Douglas Billington, Campbell, CA (US); Kaniyalal Shah, Fremont, CA (US); Daniel Parker, San Jose, CA (US); Mansoor Alghooneh, Montreal (CA); Vahid Khoshkava, San Jose, CA (US); William Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 105 days.

(21) Appl. No.: 15/184,608

(22) Filed: Jun. 16, 2016

(65) Prior Publication Data

US 2017/0364155 A1   Dec. 21, 2017

(51) Int. Cl.
| | |
|---|---|
| *G06F 3/01* | (2006.01) |
| *G06F 3/041* | (2006.01) |
| *B06B 1/04* | (2006.01) |
| *H02J 7/02* | (2016.01) |

(52) U.S. Cl.
CPC .............. *G06F 3/016* (2013.01); *B06B 1/045* (2013.01); *G06F 3/0412* (2013.01); *H02J 7/025* (2013.01); *G06F 2203/015* (2013.01)

(58) Field of Classification Search
None
See application file for complete search history.

(56) References Cited

U.S. PATENT DOCUMENTS

| | | | |
|---|---|---|---|
| 8,362,882 B2 | 1/2013 | Heubel et al. | |
| 8,610,549 B2 | 12/2013 | Modarres et al. | |
| 9,293,015 B2 | 3/2016 | Mar et al. | |
| 2006/0109256 A1* | 5/2006 | Grant ............... | G06F 3/016 |
| | | | 345/173 |
| 2006/0256075 A1 | 11/2006 | Anastas et al. | |
| 2010/0017759 A1 | 1/2010 | Birnbaum et al. | |
| 2010/0231540 A1 | 9/2010 | Cruz-Hernandez et al. | |
| 2012/0306798 A1* | 12/2012 | Zoller ............... | G06F 3/016 |
| | | | 345/173 |
| 2013/0207893 A1* | 8/2013 | Liu .................. | G06F 3/046 |
| | | | 345/157 |
| 2015/0177330 A1 | 6/2015 | Morris | |
| 2015/0288193 A1 | 10/2015 | Crosby et al. | |

FOREIGN PATENT DOCUMENTS

WO   2015/047372 A1   4/2015

OTHER PUBLICATIONS

European Patent Office Application No. 17275087.9, Extended European Search Report dated Oct. 13, 2017, 8 pages.

* cited by examiner

*Primary Examiner* — Joseph Haley
(74) *Attorney, Agent, or Firm* — Kilpatrick Townsend & Stockton LLP

(57) ABSTRACT

Systems and methods or a low profile haptic actuator are disclosed. In one embodiment, a system for a low profile haptic actuator includes: a moveable surface comprising a first coil, the moveable surface configured to move in a degree of freedom; a fixed surface beneath the moveable surface, the fixed surface comprising a second coil coupled underneath the first coil; a suspension coupled to the fixed surface and the moveable surface and configured to suspend the moveable surface; and a controller coupled to the first coil and the second coil.

19 Claims, 7 Drawing Sheets

US 10,073,525 B2

SYSTEMS AND METHODS FOR A LOW PROFILE HAPTIC ACTUATOR

FIELD OF THE INVENTION

The present invention generally relates to haptic feedback and more particularly to systems and methods for a low profile haptic actuator.

BACKGROUND

Mobile devices have become increasingly popular. In particular, mobile devices featuring touch enabled interfaces and haptic effects. For instance, mobile and other devices may be configured with touch-sensitive displays so that a user can provide input by touching portions of the touch-sensitive display. As another example, a touch enabled surface separate from a display may be used for input, such as a trackpad, mouse, or other device. Furthermore, many of these devices have become smaller and lighter and consume less power. Thus, there is a need for systems and methods for a low profile haptic actuator.

SUMMARY

In one embodiment, a system of the present disclosure may comprise a moveable surface comprising a first coil, the moveable surface configured to move in a degree of freedom; a fixed surface beneath the moveable surface, the fixed surface comprising a second coil coupled underneath the first coil; a suspension coupled to the fixed surface and the moveable surface and configured to support the moveable surface; and a controller coupled to the first coil and the second coil.

Another embodiment of the present disclosure may comprise a moveable surface comprising a plurality of moveable coils, the moveable surface configured to move in a degree of freedom; a fixed surface beneath the moveable surface, the fixed surface comprising a plurality of fixed coils coupled underneath the plurality of moveable coils; a suspension coupled to the fixed surface and the moveable surface and configured to support the moveable surface; and a controller coupled to the plurality of moveable coils and the plurality of fixed coils.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1A:
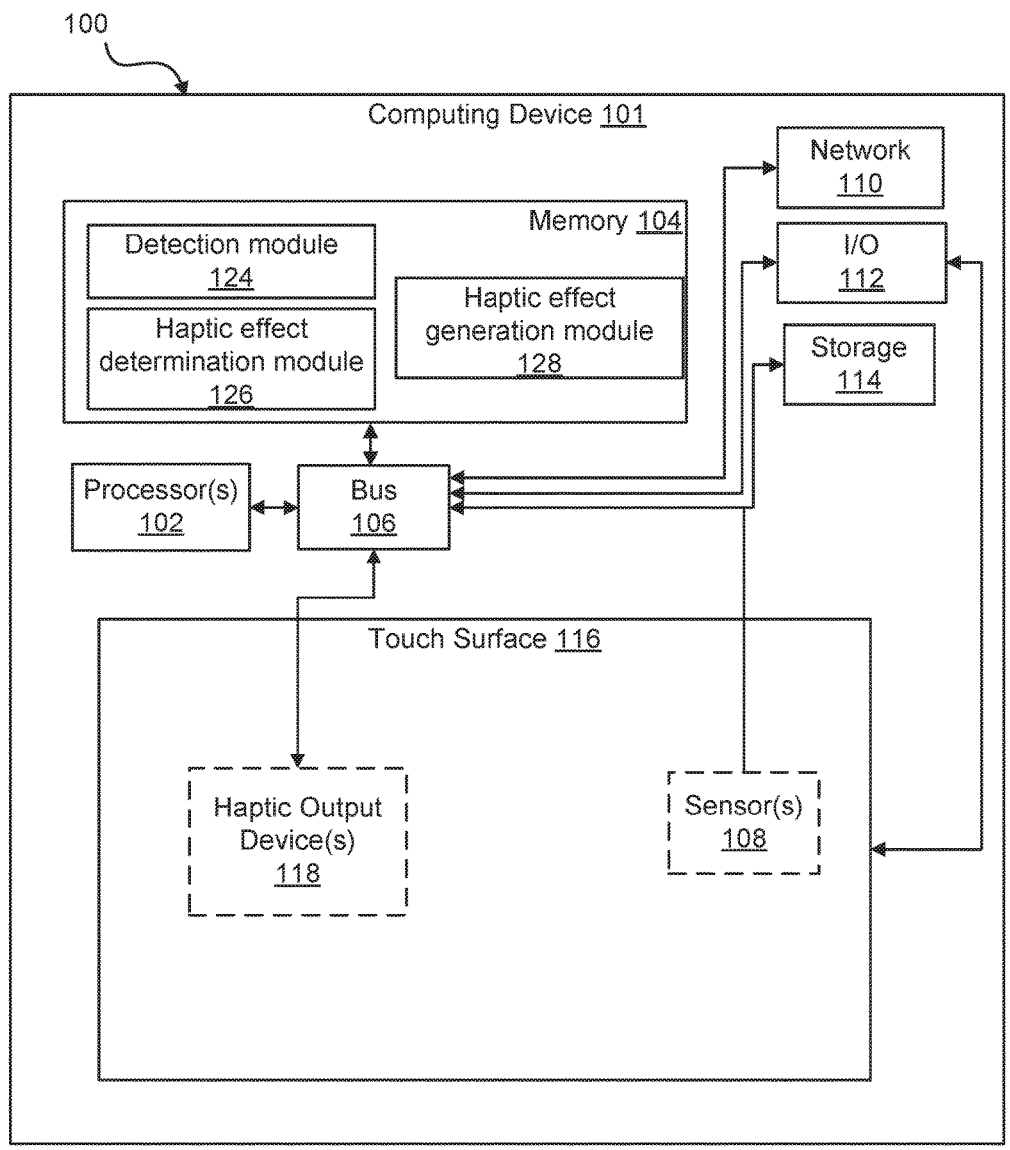
FIG. 1A shows an illustrative system for a low profile haptic actuator.

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment Thus, it is intended that this disclosure include modifications and variations as come within the scope of the appended claims and their equivalents.

Illustrative Example of a Device for a Low Profile Haptic Actuator

One illustrative embodiment of the present disclosure comprises a computing system such as a mobile computing device, (e.g., smartphone, tablet, portable music device, or laptop) or another type of computing device, e.g., desktop computer, kiosk, ATM, or other computing device. The computing system can include and/or may be in communication with one or more sensors, such as an accelerometer, as well as sensors (e.g., optical, resistive, or capacitive) for determining a location of a touch relative to a display area corresponding in this example to the screen of the device.

The illustrative device comprises a processor configured to determine haptic effects, e.g., vibrations or surface movements that are detectible to the user via touch. The processor transmits a signal associated with these haptic effects to a haptic output device configured to output the haptic effects. In the illustrative embodiment, this haptic output device comprises a low profile haptic actuator.

In one embodiment, a low profile haptic actuator may comprise a coil coupled to a fixed surface and a coil coupled to a moving surface, wherein the moving surface is positioned above the fixed surface. The moveable surface and the fixed surface may be held relatively close together by a suspension, e.g., a flexible or resilient material, spring, shock absorber, or some other type of suspension system. A controller may provide current to both coils (e.g., AC or DC current), and depending on the polarity of the current applied to each coil, the coils will attract or repel one another. The action of repelling or attracting causes the moveable surface to move in a degree of freedom, e.g., one or more of vertically or horizontally. Further, in some embodiments, the controller may rapidly change the polarity of the current, causing the moving surface to move rapidly. A user may experience this movement as a haptic effect when interacting with the illustrative computing device.

In some embodiments, a touch pad or a touch screen may be positioned overtop of the moveable surface. Thus, a user of the computing device may feel haptic effects, such as vibrations or displacements, while interacting with the device. These haptic effects may simulate features associated with objects displayed on a user interface associated with the device. For example, haptic effects may be associated with one or more of system status, program status, an action occurring in a program (e.g., movement of a character in a game, entry of data in productivity application, or receipt of a message in a messaging application), an alert that a message has been received, or any other operation associated with a computing device.

In some embodiments, rather than a single coil, each of the fixed surface and moveable surface may comprise a plurality of coils. This plurality of coils may enable more complex haptic effects, e.g., different haptic effects at different locations throughout a touch surface. In still other embodiments, one or more permanent magnets may be used in place of one or more of the coils. Further, in some embodiments, the moveable surface and any components placed upon it may comprise a flexible material. Thus, in some embodiments, the haptic effects may flex or vibrate this flexible surface in one or more locations in order to output more complex haptic effects.

Further, haptic effects may be output in response to a gesture. A gesture is any movement and/or positioning of the body and/or a physical object that conveys meaning or user intent. It will be recognized that simple gestures may be combined to form more complex gestures. For example, bringing a finger into contact with a surface may be referred to as a "finger on" gesture, while removing a finger from the surface may be referred to as a separate "finger off" gesture. If the time between the "finger on" and "finger off" gestures is relatively short, the combined gesture may be referred to as "tapping"; if the time between the "finger on" and "finger off" gestures is relatively long, the combined gesture may be referred to as "long tapping"; if the distance between the two dimensional (x, y) positions of the "finger on" and "finger off" gestures is relatively large, the combined gesture may be referred to as "swiping"; if the distance between the two dimensional (x, y) positions of the "finger on" and "finger off" gestures is relatively small, the combined gesture may be referred to as "smearing", "smudging", or "flicking". Gestures can additionally or alternatively be three dimensional. For example, a gesture may comprise positioning a body part and/or a physical object in a particular location in real space. In some embodiments, if the distance between three dimensional (x, y, z) positions during a finger movement (e.g., in real space) is relatively large, the combined gesture may be referred to as "swiping." If the distance between three dimensional (x, y, z) positions during a finger movement is relatively small, the combined gesture may be referred to as "smearing", "smudging", or "flicking." Any number of two dimensional or three dimensional simple or complex gestures may be combined in any manner to form any number of other gestures. A gesture can also be any form movement or positioning (e.g., of a body part or physical object) recognized by the computing device 100 and converted to electronic signals. Such electronic signals can activate a haptic effect, such as substantially continuous haptic feedback, where the position sensor 104 captures the user intent that generates a haptic effect.

In some embodiments, one or both coils may further comprise a ferrite material the coil on the moveable surface may comprise a ferrite). Thus, movement in this coil (e.g., when the user presses the moveable surface) will cause the inductance to change in the other coil (e.g., the coil on the fixed surface). The controller may use this change in inductance in order detect movement of the moveable surface or an amount of pressure applied to the moveable service.

In some embodiments, the computing device may be configured to charge a mobile device, such as, one or more of: a joystick, a wireless mouse, a tablet, a mobile device, a media player, or a speaker. In such an embodiment the computing device may comprise a sensor configured to detect the presence of a mobile device on or near the moveable surface. When the mobile device is detected the controller applies alternating current (AC current) to one or more of the coils. This alternating current induces a current on a corresponding coil associated with the mobile device, via the transformer effect, and charges a battery associated with the mobile device.

In some embodiments, the low profile haptic actuator may comprise a haptic tape. The haptic tape may comprise a flexible material comprising one or more opposing coils. When a controller associated with the tape applies current to the opposing coils ay attract or repel each other, distorting portions of the haptic tape. These distortions may be perceived by the user as haptic feedback. Such a haptic tape may be used to output haptic feedback on many surfaces not commonly associated with haptic feedback, e.g., handrails, seat surfaces, desktops, interfaces such as steering wheels, brakes, or gearshifts, or any other surface on which a haptic tape may be placed.

Illustrative System for a Low Profile Haptic Actuator

FIG. 1A shows an illustrative system 100 for a low profile haptic actuator. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network(s)).

I/O components 112 may be used to facilitate connection to devices such as one or more displays, touch screen displays, keyboards, mice, speakers, microphones, cameras, and/or other hardware used to input data or output data. Storage 114 represents nonvolatile storage such as magnetic, optical, or other storage media included in device 101.

System 100 further includes a touch surface 116, which, in this example, is integrated into device 101. Touch surface 116 represents any surface that is configured to sense touch input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

In some embodiments, sensor 108, touch surface 116, and I/O components 112 may be integrated into a single component such as a touch screen display. For example, in some embodiments, touch surface 116 and sensor 108 may comprise a touch screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor 102 is in communication with a single sensor 108, in other embodiments, the processor 102 is in communication with a plurality of sensors 108, for example, a first touch screen and a second touch screen. The sensor 108 is configured to detect user interaction and, based on the user interaction, transmit signals to processor 102. In some embodiments, sensor 108 may be configured to detect multiple aspects of the user interaction. For example, sensor 108 may detect the speed and pressure of a user interaction and incorporate this information into the interface signal.

Device 101 further comprises a haptic output device 118. In the example shown in FIG. 1A haptic output device 118 is in communication with processor 102 and is coupled to touch surface 116. The embodiment shown in FIG. 1A comprises a single haptic output device 118. In other embodiments, computing device 101 may comprise a plurality of haptic output devices.

In one embodiment, the haptic output device 118 may comprise a low profile haptic actuator. Such an actuator may comprise a coil coupled to a fixed surface and a coil coupled to a moving surface, wherein the moving surface is positioned above the fixed surface. The moveable surface and the fixed surface may be held relatively close together by a suspension, e.g., a flexible or resilient material, spring, shock absorber, or some other type of suspension system. A controller may provide AC or DC current to both coils, and depending on the polarity of the current applied to each coil, the coils will attract or repel one another. The action of repelling or attracting causes the moveable surface to move, e.g., move vertically. Further, in some embodiments, the controller may rapidly change the polarity of the current, causing the moving surface to move rapidly. A user may experience this movement as a haptic effect when interacting with the illustrative computing device.

In some embodiments, rather than a single coil, each of the fixed surface and moveable surface of the low profile haptic actuator may comprise a plurality of coils. This plurality of coils may enable more complex haptic effects, e.g., different haptic effects at different locations throughout a touch surface. Further, in some embodiments, the moveable surface and any components placed upon it may comprise a flexible material. Thus, in some embodiments, the haptic effects may flex or vibrate this flexible surface in one or more locations in order to output more complex haptic effects, such as localized haptic effects. In some embodiments, one or more coils may further comprise a ferrite material. Thus, changing the distance between the coils (e.g., when the user presses the moveable surface) will cause the inductance to change in the opposing coil. The controller may use this change in inductance in order to detect movement of the moveable surface or pressure applied to the moveable surface.

In some embodiments, the haptic output device 118 may comprise a haptic tape. The haptic tape may comprise a material comprising one or more opposing coils. When a controller associated with the haptic tape applies current to one or more of the opposing coils, the coil may attract or repel its opposing coil. This attraction or repulsion will distort sections of the haptic tape. These distortions may be perceived by the user as haptic feedback. In some embodiments the haptic tape may comprise an adhesive material on one side, enabling it to be easily placed in a location. A haptic tape may be used to output haptic feedback on many surfaces not commonly associated with haptic feedback, e.g., linear surfaces such as handrails, or other types of surfaces, such as seat surfaces, desktops, interfaces such as steering wheels, brakes, or gearshifts, or any other type of surface.

In some embodiments, haptic output device 118 may apply electrostatic friction or attraction, for example by use of an electrostatic surface actuator, to simulate a texture on the surface of touch surface 116. Similarly, in some embodiments, haptic output device 118 may use electrostatic attraction to vary the friction the user feels on the surface of touch surface 116. For example, in one embodiment, haptic output device 118 may comprise an electrostatic display or any other device that applies voltages and currents instead of mechanical motion to generate a haptic effect. In such an embodiment, an electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116 or vary the coefficient of friction felt as the object moves across the surface of touch surface 116. Furthermore, in some embodiments, an electrostatic actuator may be used in conjunction with traditional actuators to output haptic effects. In such an embodiment, the actuators may vibrate, while at the same time an electrostatic actuator may simulate a different texture, or other effects, on the surface of touch surface 116.

Although a single haptic output device 118 is shown here, embodiments may use multiple haptic output devices of the same or different type to output haptic effects. For example, haptic output device 118 may comprise one or more of, for example, a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA), a low profile haptic actuator, a haptic tape, or a haptic output device configured to output an electrostatic effect, such as an Electrostatic Friction (ESF) actuator. In some embodiments, haptic output device 118 may comprise a plurality of actuators, for example a low profile haptic actuator, a piezoelectric actuator, and an Turning to memory 104, exemplary program components 124, 126, and 128 are depicted to illustrate how a device may be configured to determine and output haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature to generate on the touch surface. Module 126 may further comprise code that selects one or more haptic effects to provide in order to simulate the feature. For example, some or all of the area of touch surface 116 may be mapped to a graphical user interface. Different haptic effects may be selected based on the location of a touch in order to simulate the presence of the feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to hap c output device 118. As a further example, a desired haptic effect may be indicated along with target coordinates for the texture and an appropriate waveform sent to one or more actuators to generate appropriate displacement of the surface (and/or other device components) to provide the haptic effect. Some embodiments may utilize multiple haptic output devices in concert to simulate a feature. For instance, a variation in texture may be used to simulate crossing a boundary between buttons on an interface while a vibrotactile effect simulates the response when the button is pressed.

Figure 1B:
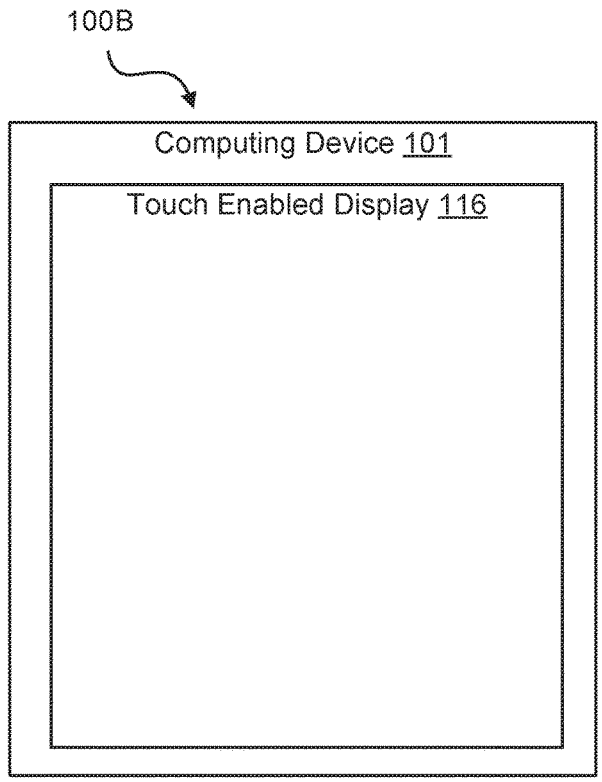
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
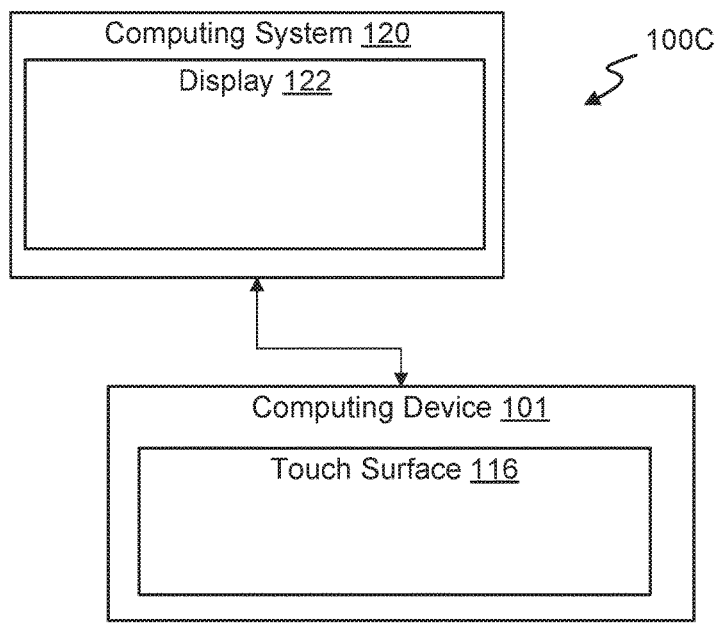
FIG. 1C illustrates an external view of another embodiment of the system shown in FIG. 1A.

FIG. 1C illustrates another example of a touch enabled computing system 1000 in which the touch surface does not overlay a display. In this example, a computing device 101 features a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
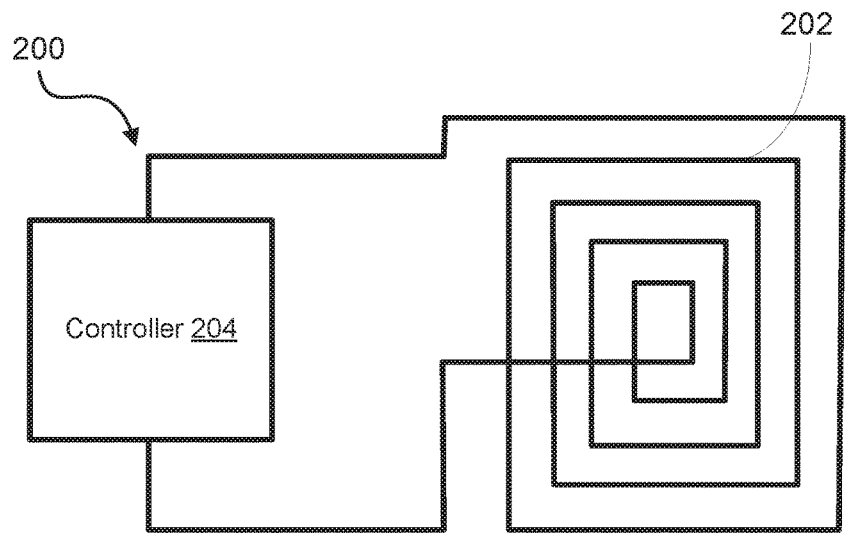
FIG. 2A illustrates an example embodiment of a coil for a low profile haptic actuator according to one embodiment.
Figure 2B:
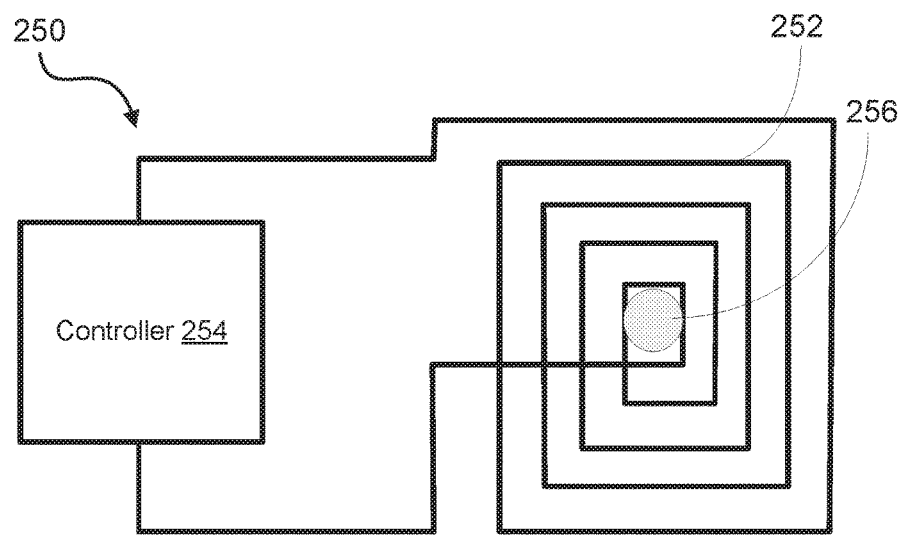
FIG. 2B illustrates another example embodiment for a coil for a low profile haptic actuator according to one embodiment.

FIGS. 2A-2B illustrate an example of a system 200 comprising a coil for use in a low profile haptic actuator according to one embodiment. As shown in FIG. 2A, system 200 comprises a coil 202 and controller 204. Coil 202 may comprise any conductive material. In some embodiments, coil 202 may comprise flex circuit technology, enabling the coil to be flexible. In some embodiments multiple coils 202 may be stacked on top of each other to increase the strength of magnetic fields associated with the coil.

System 200 further comprise a controller 204. Controller 204 may comprise a processor, such as processor 102 described above. Alternatively, controller 204 may comprise a component in communication with, or controlled by, processor 102. Controller is configured to provide a drive signal (e.g., an AC or DC signal) to coil 202 in order to output a magnetic field, which may be used to output a haptic effect, e.g., by outputting a magnetic force attracting or opposing another coil. Further, in some embodiments, controller 204 may be configured to apply current to coil 202, which is used to wirelessly charge a mobile device using the "transformer effect," wherein a current is induced in a corresponding coil in a mobile device when that mobile device is near coil 202. This induced current may be used to charge a battery of the mobile device.

Controller 204 may comprise one or more of: relays, transistor circuits, op-amp circuits, power-supply circuits, H-Bridge driver amplifiers, batteries, capacitors, oscillator circuits (such as an L/C oscillator or an R/C oscillator). In some embodiments more than one controller 204 may be used, e.g., one for each coil. In some embodiments the controller is coupled to a processor (e.g., processor 102 described above), and outputs current to one or more of the coils based on signals received from the processor. Alternatively, in some embodiments, the controller comprises a processor, memory, and programming instructions for its operation.

In some embodiments, the coil 202 may be embedded in a surface using a thin film technology. For example, in some embodiments, the coil 202 may be embedded in a touch surface, a support surface, or a surface associated with a haptic tape. In some embodiments, thin film technology may be used to embed a coil with a thickness in the micron range into a surface.

FIG. 2B illustrates another example of a system 250 comprising a coil for use in a low profile haptic actuator according to one embodiment. As shown in FIG. 2A, system 200 comprises a coil 252 and controller 254. The system 250 is similar to system 200 described above with regard to FIG. 2A, however, as shown in FIG. 2B, system 250 further comprises a ferrite 256 associated with coil 252. Ferrite 256 may comprise any form of ferrous material, e.g., a hard or a soft ferrite.

When coil 252 moves near another coil the inductance of that coil will be changed. A controller may measure this change in inductance to determine that coil 252 and its ferrite 256 have moved. Thus, in some embodiments, the low profile haptic actuator may be used to output haptic effects and also to detect user interaction (e.g., to detect that the user has pressed on a surface, such as a touch surface, associated with coil 252). This interaction may comprise one or more of movement of the coil 252 and ferrite 256 or pressure applied to a surface associated with coil 252 and ferrite 256.

Figure 3A:
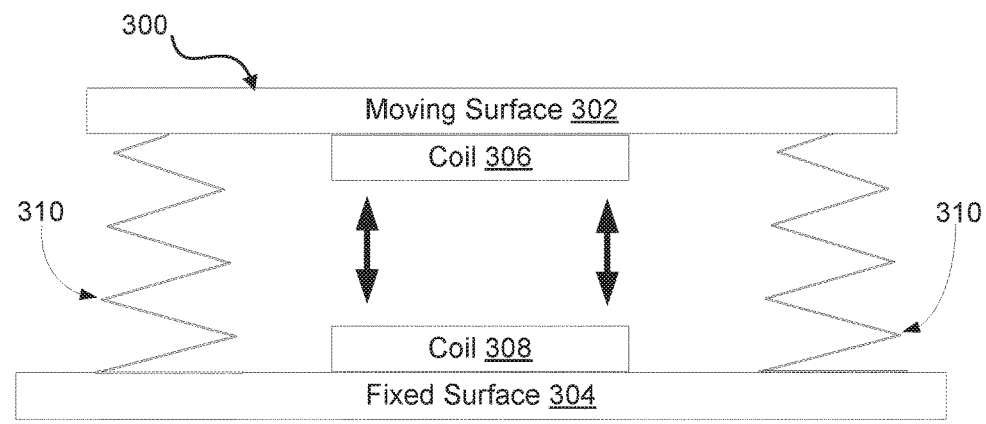
FIG. 3A illustrates an example embodiment for a low profile haptic actuator.

Turning now to FIG. 3A, FIG. 3A comprises an example embodiment for a low profile haptic actuator 300 according to the present disclosure. As shown in FIG. 3A, the low profile haptic actuator 300 comprises a moving surface 302 and a fixed surface 304. Each of surfaces 306 and 308 comprises a coil, moving surface 302 comprises a coil 306 and fixed surface 304 comprises a coil 308. Each of coils 306 and 308 may comprise a structure similar to coils 200 and 250 described above with regard to FIGS. 2A and 2B. Further, as shown in FIG. 3A two suspensions 310 support moving surface 302 above fixed surface 304. Suspensions 310 may comprise one or more of: a flexible or resilient material, spring, shock absorber, or some other type of suspension system.

In the embodiment shown in FIG. 3A when one or more controllers provide a current to one or both of coils 306 and 308 the coils will be attracted or repelled. This causes moving surface 302 to move. A user interacting with moving surface 302 will interpret this movement as a haptic effect. Further, in some embodiments, a touch sensitive interface, such as a touch pad or a touch-screen display, may be mounted overtop of moving surface 302. Thus, the haptic effect may be output as the user interacts with features of a graphical user interface shown on a display associated with the touch sensitive interface.

Further, in some embodiments, one of coils 306 or 308 may further comprise a ferrite, as described above with regard to FIG. 2B. In such an embodiment, a controller may be configured to detect the change in inductance in one or both of the coils as the coil moves. Thus, embodiments of the present disclosure may be used to both output haptic effects and to detect movement or pressure, e.g., movement of a touch-sensitive interface positioned overtop of moving surface 302.

Further, in some embodiments, one of coils 306 or 308 may be replaced with one or more permanent magnets. The permanent magnet may similarly repel or attract the opposing coil depending on the polarity of the magnet and the current flowing through the opposing coil.

Figure 3B:
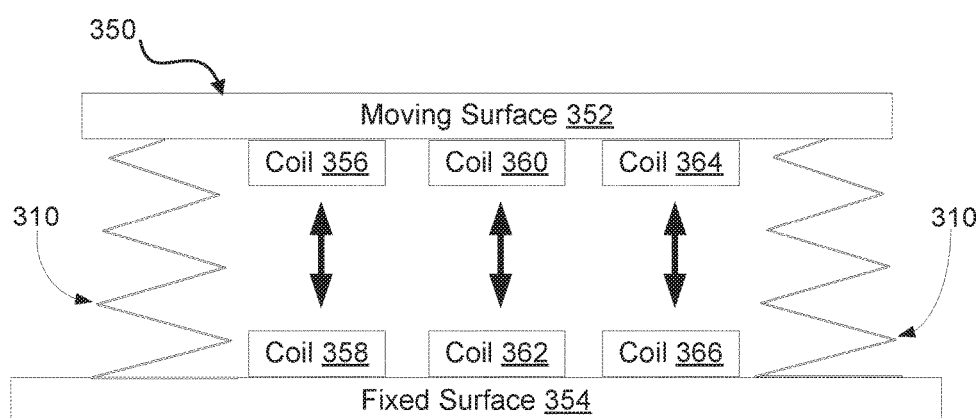
FIG. 3B illustrates another example embodiment for a low profile haptic actuator.

Turning now to FIG. 3B, FIG. 3B illustrates another embodiment of a low profile haptic actuator 350 according to the present disclosure. As shown in FIG. 3B, the low profile haptic actuator 350 comprises a moving surface 352 and a fixed surface 354. Further, as shown in FIG. 3A two suspensions 310 support moving surface 352 above fixed surface 354. Suspensions 310 may comprise one or more of: a flexible or resilient material, spring, shock absorber, or some other type of suspension system.

Further, as shown in FIG. 3B, each of moveable surfaces 306 and 308 comprises a plurality of coils, moving surface 302 comprises coils 356, 360, and 364, and fixed surface 304 comprises coils 358, 362, and 366. Each of these coils may comprise a structure similar to coils 200 and 250 described above with regard to FIGS. 2A and 2B. In other embodiments, the moving surface 352 and fixed surface 354 may comprise more or fewer coils.

In the embodiment shown in FIG. 3B when one or more controllers provide a current to one or more pairs of coils (e.g., coils 356 and 358), that pair of coils will be attracted or repelled. This causes moving surface 352 to move. A user interacting with moving surface 352 will interpret this movement as a haptic effect. Further, in some embodiments, moving surface 352 further comprises a flexible surface. In such an embodiment, each pair of coils may output a haptic effect at a location isolated from the other coil pairs. Such an embodiment may enable complex haptic effects, e.g., ripples or waives moving across a touch surface, localized haptic effects, and/or surface deformations.

Further, in some embodiments, one or more of the coils may further comprise a ferrite, as described above with regard to FIG. 2B. In such an embodiment, a controller may be configured to detect the change in inductance in one or both of the coils as a coil in the coil pair moves. Thus, embodiments of the present disclosure may be used to both output haptic effects and to detect movement or pressure, e.g., movement of a touch-sensitive interface positioned overtop of moving surface 352 or pressure at a specific location on the touch-sensitive interface, Further, in some embodiments, one or more of coils 356, 358, 360, 362, 364, or 366 may be replaced with one or more permanent magnets. The permanent magnet may similarly repel or attract the opposing coil depending on the polarity of the magnet and the current flowing through the opposing coil.

Figure 4:
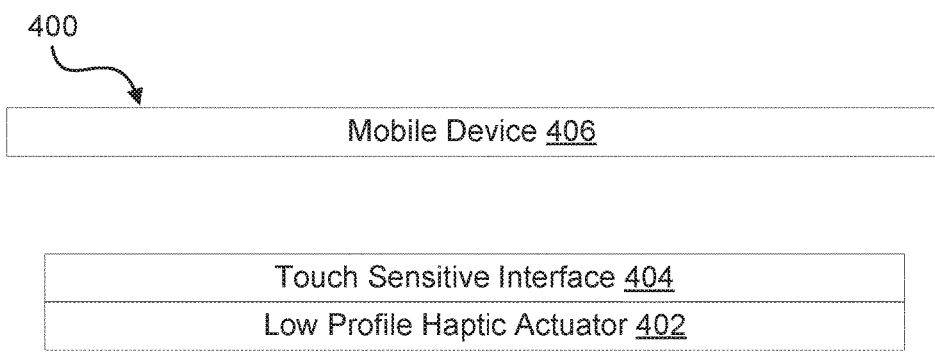
FIG. 4 illustrates another example embodiment for a low profile haptic actuator.

Turning now to FIG. 4, FIG. 4 comprises a system 400 according to one embodiment of the present disclosure. The system 400 comprise a low profile haptic actuator 402. The low profile haptic actuator 402 may comprise a system similar to the systems 300 and 350 described above with regard to FIGS. 3A and 3B. Further, as shown in FIG. 3, a touch sensitive interface 404 may be coupled overtop of the low profile haptic actuator 402. The touch sensitive interface 404 may comprise a peripheral device for interacting with a computer, e.g., a touch pad or a touch screen.

As shown in FIG. 4, the system 400 further comprises a mobile device 406. The mobile device 406 may comprise one or more of, for example, a joystick, a wireless mouse, a tablet, a mobile device, a media player, or a speaker. The mobile device 406 further comprises a coil. When the mobile device is placed close to low profile haptic actuator 402, one or more of the coils in the low profile haptic actuator 402 may induce a current onto this coil via the transformer effect. This current may be used to apply power to the mobile device, e.g., to wirelessly charge its battery. Thus, according to some embodiments of the present disclosure, a low profile haptic actuator may be used both to output haptic effects an also to wirelessly power mobile devices.

Figure 5:
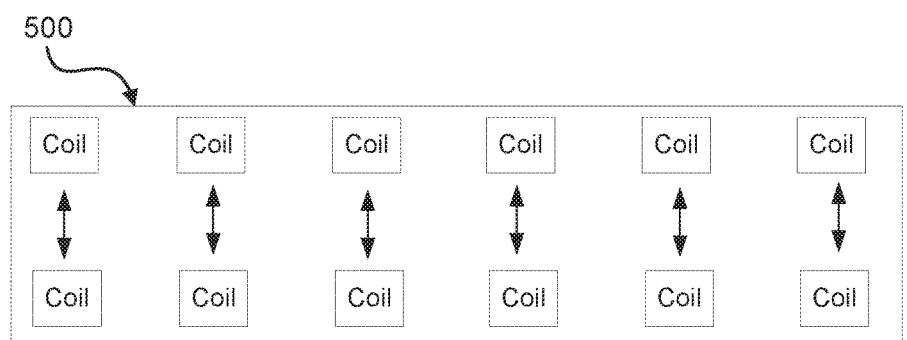
FIG. 5 illustrates another example embodiment for a low profile haptic actuator.

Turning now to FIG. 5, FIG. 5 comprises another example embodiment of a low profile haptic actuator 500. As shown in FIG. 5, the system 500 comprises a haptic tape. The haptic tape comprises a plurality of coil pairs. When current is applied to one of these coil pairs the pair will either repel or attract, as described above. Thus, a controller associated with the haptic tape may determine and output haptic effects at isolated points on the haptic tape or along the entirety of the haptic tape.

In some embodiments, the haptic tape may comprise a plurality of these coil pairs and be both relatively thin and flexible. Thus, the haptic tape may be configured to be placed along surfaces not normally associated with haptic effects, e.g., a handrail, a seat back, a dashboard, a desktop, a door, a wall, or some other surface.

Figure 6:
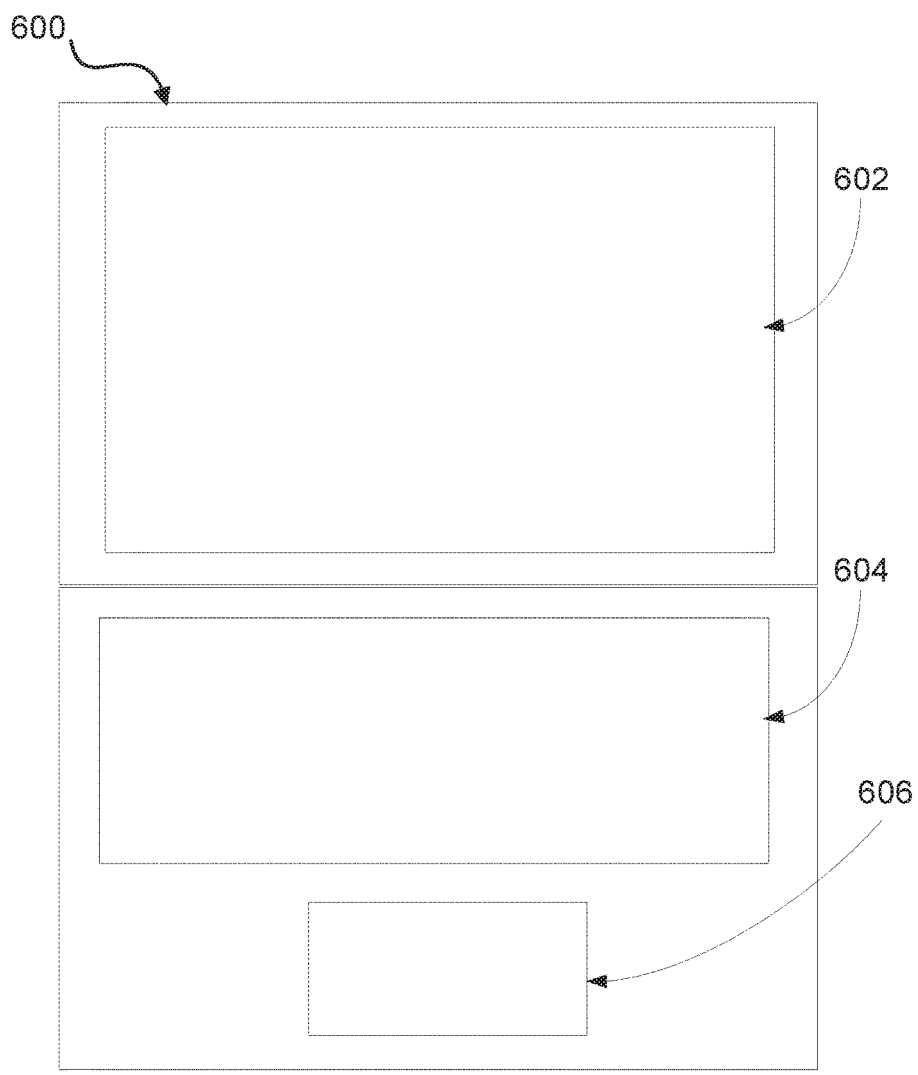
FIG. 6 illustrates another example embodiment for a low profile haptic actuator.

Turning now to FIG. 6, FIG. 6 comprises another embodiment of a low profile haptic actuator according to one embodiment of the present disclosure. FIG. 6 shows a laptop computer 600. In other embodiments, rather than a laptop, the computer may comprise a desktop computer or a multifunction controller. For example, a controller for use in a kiosk, ATM, or other computing device. Further, in some embodiments, computing device may comprise a controller for use in a vehicle, such as an automobile, airplane, boat, electric-cart, construction equipment, or some other vehicle. Further, in some embodiments, computing device may comprise a controller for use in an appliance, e.g., a refrigerator, oven, dishwasher, washing machine, or any other appliance.

As shown in FIG. 6, the laptop computer 600 comprises a display 602, a keyboard 604, and a touch pad 606. In the embodiment shown in FIG. 6, the touch surface 606 may comprise a low profile haptic actuator according to the embodiments described above, e.g., the embodiments described with regard to FIGS. 3A, 3B, and/or 4. As described above, this low profile haptic actuator may be used to output haptic effects to the user via the touch pad 606. Further, the low profile haptic actuator may be configured to remotely charge one or more mobile devices when placed over top of the touch pad 606.

In one embodiment, a low profile haptic actuator may comprise a coil coupled to a fixed surface and a coil coupled to a moving surface, wherein the moving surface is positioned above the fixed surface. The moveable surface and the fixed surface may be held relatively close together by a suspension, e.g., a flexible or resilient material, spring, shock absorber, or some other type of suspension system. A controller may provide current to both coils and, depending on the polarity of the current applied to each coil, the coils will attract or repel one another. The action of repelling or attracting causes the moveable surface to move vertically. Further, in some embodiments, the controller may rapidly change the polarity of the current, causing the moving surface to move rapidly. A user may experience this movement as a haptic effect when interacting with the illustrative computing device.

Illustrative Methods for a Low Profile Haptic Actuator

Figure 7:
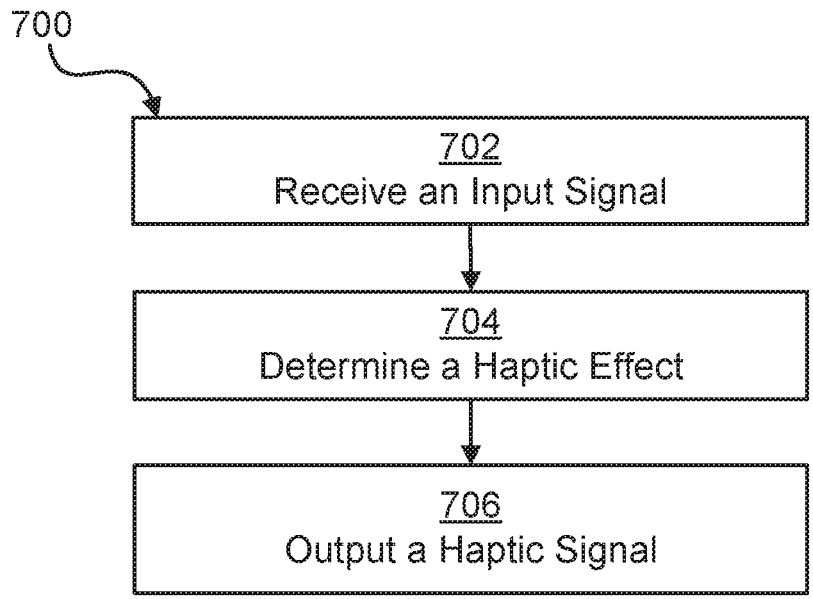
FIG. 7 is a flow chart for operation of a low profile haptic actuator according to one embodiment.

FIG. 7 is a flow chart for operation of a low profile haptic actuator according to one embodiment. In some embodiments, the steps in FIG. 7 may be implemented in program code executed by a processor, for example, the processor in a general purpose computer, mobile device, or server. In some embodiments, these steps may be implemented by a group of processors. In some embodiments the steps shown in FIG. 7 may be performed in a different order. Alternatively, in some embodiments, one or more of the steps shown in FIG. 7 may be skipped, or additional steps not shown in FIG. 7 may be performed. The steps below are described with reference to components described above with regard to system 100 shown in FIG. 1A.

The method 700 begins at step 702 when processor 102 receives an input signal from sensor 108. Sensor 108 may comprise one or more of a plurality of sensors known in the art, for example, resistive and/or capacitive sensors may be embedded in touch surface 116 and used to determine the location of a touch and other information, such as pressure. As another example, optical sensors with a view of the touch surface may be used to determine the touch position. In still other embodiments, sensors 108 and touch surface 116 may comprise a torch screen display.

Next, at step 704, the processor 102 determines a haptic effect. In some embodiments, the haptic effect may comprise a vibration or surface deformation type effect that the user perceives via touch surface 116. In some embodiments, processor 102 may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency.

Further, in some embodiments, users may be able to select a haptic effect in order customize computing device 101. For example, in some embodiments, a user may select a haptic effect such as a particular vibration or deformation to allow for personalization of the feel of a touch interface. In some embodiments, the user may select these personalized haptic effects through modifying settings or downloading software associated with particular effects. In other embodiments, the user may designate effects through detected interaction with the device. In some embodiments, this personalization of haptic effects may increase the user's sense of ownership and the connection between the user and his or her device.

In still other embodiments, device manufacturers or software developers may select distinctive haptic effects to brand their devices or user interfaces. In some embodiments, these haptic effects may be unique to branded devices and similar to other distinctive elements that may increase brand awareness. For example, many mobile devices and tablets may comprise a custom or branded home screen environment. For example, in some embodiments, devices produced by different manufacturers may still comprise the same operating system; however, manufacturers may distinguish their devices by modifying this home screen environment. Thus, in some embodiments, some device manufacturers or software developers may use haptic effects such as vibrations or surface deformations either in home screens or in other user interfaces to create a unique and differentiated user experience.

The method 700 continues when processor 102 outputs a haptic signal associated with the haptic effect 706. The processor 102 outputs the haptic signal to a haptic output device 118 configured to output the haptic effect. In some embodiments, haptic output device 118 may comprise a low profile haptic actuator. In some embodiments, processor 102 may control a plurality of haptic output devices to simulate multiple haptic effects. For example, in one embodiment, processor 102 may control an electrostatic actuator to simulate a texture on the surface of touch surface 116 and processor 102 may further control a low profile haptic actuator to simulate other features.

Figure 8:
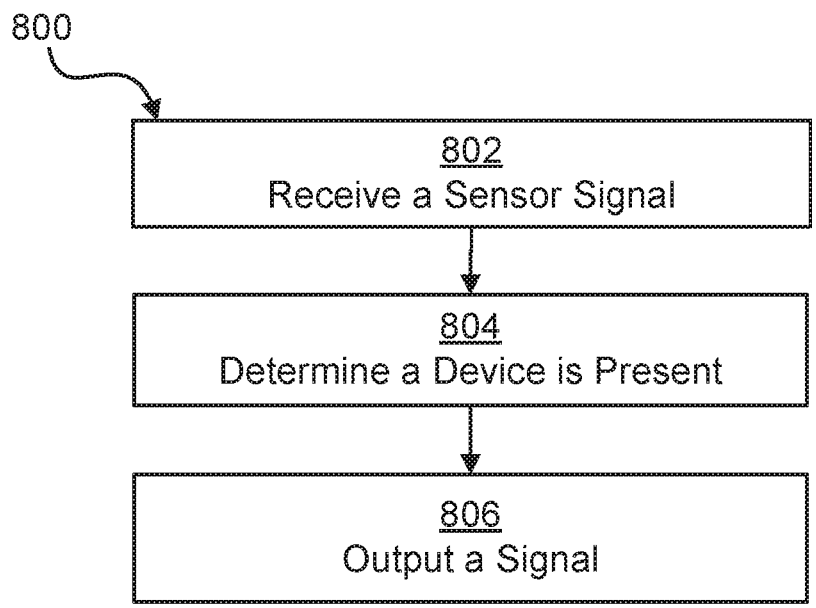
FIG. 8 is another flow chart for operation of a low profile haptic actuator according to one embodiment.

FIG. 8 is a flow chart for operation of a low profile haptic actuator according to one embodiment. In some embodiments, the steps in FIG. 8 may be implemented in program code executed by a processor, for example, the processor in a general purpose computer, mobile device, or server. In some embodiments, these steps may be implemented by a group of processors. In some embodiments the steps shown in FIG. 8 may be performed in a different order. Alternatively, in some embodiments, one or more of the steps shown in FIG. 8 may be skipped, or additional steps not shown in FIG. 8 may be performed. The steps below are described with reference to components described above with regard to system 100 shown in FIG. 1A.

The method 800 begins when processor 102 receives a sensor signal 802. The sensor signal may be received from sensors 108 or from input/output devices 102. The sensor signal may indicate that a mobile device comprising remote charging capability has been placed near a low profile haptic actuator. For example, the sensor signal may comprise user input on a peripheral device such as a touch pad, keyboard, or keypad, or touchscreen that a device comprising remote charging capability is near a low profile haptic actuator. Alternatively, in sonic embodiments, sensors may be configured to detect the presence of a mobile device comprising remote charging capability.

At step 804 the processor 102 determines that a device comprising remote charging capability is present. The processor 102 makes this determination based on the sensor signal received at step 802 above.

At step 806 the processor 102 controls a controller to output a signal. The signal comprises a current output to one or more coils associated with a low profile haptic actuator. This current is configured to induce a current on a coil associated with the mobile device via the transformer effect. The induced current may be used to power the mobile device, e.g., to charge its battery or power its other operations.

Advantages of a Low Profile Haptic Actuator

There are numerous advantages of a low profile haptic actuator. One advantage is a very compact actuator for outputting haptic effects. Further, embodiments disclosed herein may enable more complex haptic effects than other actuators, e.g., ripple or waive effects. Further, embodiments disclosed herein may enable actuators to be used for multiple purposes, e.g., outputting haptic effects, detecting user interaction, and charging mobile devices. Further, embodiments disclosed herein may enable haptic effects to be incorporated into a broader range of locations and device types. This may increase user satisfaction and further adoption of mobile devices featuring haptic effects.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital or analog electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system for a low profile haptic actuator comprising:
   a moveable surface comprising two or more first coils, the moveable surface configured to move in a degree of freedom;
   a fixed surface beneath the moveable surface, the fixed surface comprising two or more second coils coupled underneath the two or more first coils;
   a suspension coupled to the fixed surface and the moveable surface and configured to support the moveable surface, wherein the moveable surface comprises a flexible surface; and
   a controller electrically coupled to the two or more first coils and the two or more second coils, the controller configured to apply current to one of the two or more first coils and one of the two or more second coils without applying current to others of the two or more first coils and two or more second coils.

2. The system of claim 1, wherein the moveable surface comprises a touch sensitive interface configured to detect user interaction.

3. The system of claim 1, wherein the moveable surface further comprises a ferrite material.

4. The system of claim 3, wherein the controller is configured to detect a change in inductance in one or more of the second coils, wherein the change in inductance is associated with one or more of movement of the moveable surface or pressure applied to the moveable surface.

5. The system of claim 1, wherein the controller is configured to apply current to one or both of the two or more first coils and the two or more second coils.

6. The system of claim 5, wherein the controller is configured to determine a haptic effect and wherein the current is configured to cause the two or more first coils to move the moveable surface to output the haptic effect.

7. The system of claim 5, wherein the current is configured to charge a battery of a device near the moveable surface.

8. The system of claim 7, further comprising a sensor configured to detect a presence of the device, and wherein the controller is configured to output the current when the device is present.

9. The system of claim 7, wherein the device comprises one or more of: a joystick, a wireless mouse, a tablet, a mobile device, a media player, or a speaker.

10. The system of claim 1, wherein the controller is configured to apply current to the first coils and the second coils to move the first coils to output a haptic effect.

11. A system for a low profile haptic actuator comprising:
    a moveable surface comprising a plurality of moveable coils, the moveable surface configured to move in a degree of freedom, the moveable surface comprising a material configured to flex at the location of each of the plurality of moveable coils;
    a fixed surface beneath the moveable surface, the fixed surface comprising a plurality of fixed coils coupled underneath the plurality of moveable coils;
    a suspension coupled to the fixed surface and the moveable surface and configured to support the moveable surface; and
    a controller coupled to the plurality of moveable coils and the plurality of fixed coils, the controller configured to control each of the plurality of moveable coils and each of the plurality of fixed coils independently of other coils.

12. The system of claim 11, wherein the moveable surface comprises a touch sensitive interface configured to detect user interaction.

13. The system of claim 11, wherein the moveable surface further comprises a ferrite material.

14. The system of claim 13, wherein the controller is configured to detect a change in inductance in one or more of the plurality of fixed coils, wherein the change in inductance is associated with one or more of movement of the moveable surface or pressure applied to the moveable surface.

15. The system of claim 11, wherein the controller is configured to apply current to one or more of the moveable coils.

16. The system of claim 15, wherein the controller is configured to determine a haptic effect and wherein the current is configured to cause one or more of the moveable coils to move the moveable surface to output the haptic effect.

17. The system of claim 15, wherein the current is configured to charge a battery of a device near the moveable surface.

18. The system of claim 17, further comprising a sensor configured to detect a presence of the device, and wherein the controller is configured to output the current when the device is present.

19. The system of claim 17, wherein the device comprises one or more of: a joystick, a wireless mouse, a tablet, a mobile device, a media player, or a speaker.

* * * * *